US008784202B2

(12) United States Patent
Hansen et al.

(10) Patent No.: US 8,784,202 B2
(45) Date of Patent: Jul. 22, 2014

(54) APPARATUS AND METHOD FOR REPOSITIONING A VIRTUAL CAMERA BASED ON A CHANGED GAME STATE

(75) Inventors: Scott Robert Hansen, Vancouver (CA); Shigeru Miyamoto, Kyoto (JP); Yoshihito Ikebata, Kyoto (JP); Ryuichi Nakada, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 137 days.

(21) Appl. No.: 13/152,879

(22) Filed: Jun. 3, 2011

(65) Prior Publication Data
US 2012/0309519 A1     Dec. 6, 2012

(51) Int. Cl.
| A63F 9/24 | (2006.01) |
| A63F 13/00 | (2014.01) |
| G06F 17/00 | (2006.01) |
| G06F 19/00 | (2011.01) |

(52) U.S. Cl.
USPC .................................. 463/31; 463/32; 463/33

(58) Field of Classification Search
USPC ........................................................... 463/31
See application file for complete search history.

(56) References Cited

U.S. PATENT DOCUMENTS

| 6,139,434 A | 10/2000 | Miyamoto et al. |
| 6,155,926 A | 12/2000 | Miyamoto et al. |
| 6,267,673 B1 | 7/2001 | Miyamoto et al. |
| 6,718,058 B2 * | 4/2004 | Ochi et al. ..................... 382/154 |

OTHER PUBLICATIONS

Platinum Games, Vanquish, Oct. 12, 2010, Sega, YouTube gameplay video: http://www.youtube.com/watch?v=ScCr_U-6loE.*
Platinum Games, Vanquish, Oct. 19, 2010, Sega, Wikipedia general information: http://en.wikipedia.org/wiki/Vanquish_(video_game).*
"Katamari Damacy," Sep. 22, 2004, Namco, http://www.youtube.com/watch?v=zZFp03S14cE and game manual.*
European Search Report issued for European Patent Application No. 12170670.9-2218, dated Dec. 14, 2012.
Partial European Search Report corresponding to Application No. EP 12 17 0670 dated Apr. 16, 2013.

* cited by examiner

*Primary Examiner* — Kevin Y Kim
(74) *Attorney, Agent, or Firm* — Nixon & Vanderhye, P.C.

(57) ABSTRACT

An apparatus and method is provided for controlling a virtual camera. The virtual camera is positioned in a first position and a first direction while an object is in a first state and the virtual camera is moved to a second position and second direction when the object transitions from a first state to a second state. The virtual camera is held in the second position and second direction while the object is in the second state and then moves back to the first position and first direction when the object transitions from the second state back to the first state. While the virtual camera is in the second position and second direction, the lowest part of the object is made more easily viewable.

33 Claims, 11 Drawing Sheets

APPARATUS AND METHOD FOR REPOSITIONING A VIRTUAL CAMERA BASED ON A CHANGED GAME STATE

BACKGROUND

Player characters in video games have always been adapted to change movement speeds depending upon game conditions or user input. Many first-person shooter games, for example, allow the player to push a button or move a cross-switch to make the player character run in the first person viewpoint. Likewise, many games played in a third-person view allow the player to increase the speed of the player character in order to make the player character run.

However, these games do not allow the virtual camera to automatically shift to a position looking downward to give the player a more "realistic" sense of the player character running in the third-person view. It is therefore desirable to provide a gaming environment where the virtual camera will automatically move upward while viewing downward when the player character runs so that the player character's footing is made more easily viewable.

BRIEF SUMMARY

In order to address this issue, a game environment is presented where the virtual camera automatically shifts downward to give a slightly "overhead" view of the player character in the third-person view, while the player character is running in order to make the player character's footing more easily viewable. The system detects the player character's changed game state and offsets the virtual camera position so it is moved to a position higher than the position the virtual camera maintains while the player character is walking.

A method for controlling a virtual camera is provided. The virtual camera is positioned in a first position while an object is in a first state. When the object transitions to a second state, the virtual camera is moved to a second position. The virtual camera is held in the second position while the object is in the second state and then the virtual camera is moved back to the first position when the object transitions from the second state back to the first state. While in the second position, a footing of the object is made more easily viewable.

A non-transitory computer-readable storage medium is disclosed having computer readable code embodied therein is provided for executing the virtual camera control method described in the preceding paragraph.

Another aspect relates to a gaming apparatus having an inputting device and a memory configured to store a program for controlling a virtual camera. The gaming device also has a processor configure to control the virtual camera by positioning the virtual camera in a first position while the object is in a first state and moving the virtual camera to a second position while the object transitions from the first state to a second state. The processor holds the virtual camera in the second position while the object is in the second state and moves the virtual camera back to the first position when the object transitions from the second state back to the first state. While in the second position, a lowest part (e.g., footing) of the object is made more easily viewable in an image generated when the virtual camera is in the second position.

Yet another aspect relates to a method that uses a computer processor and generates a first image of a virtual object in a field of view of a virtual camera having an initial orientation and an initial position in a virtual world. An input is received to increase a moving speed of the virtual object within the virtual world and the position of the virtual camera is raised from the initial position upon receiving the input to increase the moving speed of the virtual object. The orientation of the virtual camera is changed from the initial orientation upon receiving the input to increase the moving speed of the virtual object and a second image of the virtual object in a field of view of the virtual camera is generated at the raised position and downwardly changed orientation.

Another aspect relates to a system having a device configured to provide an instruction to increase a moving speed of a virtual object within a virtual world. The system also has a computer processor configured to generate a first image of the virtual object in a field of view of a virtual camera having an initial orientation and an initial position, raise, based upon on the instruction to increase the moving speed of the virtual object, the position of the virtual camera from the initial position, change downwardly, based upon on the instruction to increase the moving speed of the virtual object, the orientation of the virtual camera from the initial orientation, and generate at least a second image of the virtual object in a field of view of the virtual camera having the changed orientation and the changed position. The device can be a hand-held user-operable device.

In a non-limiting example implementation, a lowest part of the virtual object is more easily viewable in the second image than the first image.

In yet another non-limiting, example implementation, the raising the position of the virtual camera occurs simultaneously with downwardly changing the orientation of the virtual camera.

In a non-limiting, example implementation, the virtual camera keeps the object in a substantially center position of a viewpoint of the virtual camera while the object is in the second state.

In another example implementation, the object can be a player character and the player character can be walking in the first state and running in the second state.

In yet another example implementation, the virtual camera moves to a location above the player character and views a direction downward toward the player character.

In another example implementation, the virtual camera moves to a second position in a linear correspondence with a speed of the player character. The virtual camera can also, for example, move to the second position when the player character reaches a maximum speed.

DETAILED DESCRIPTION OF THE DRAWINGS

Figure 1:
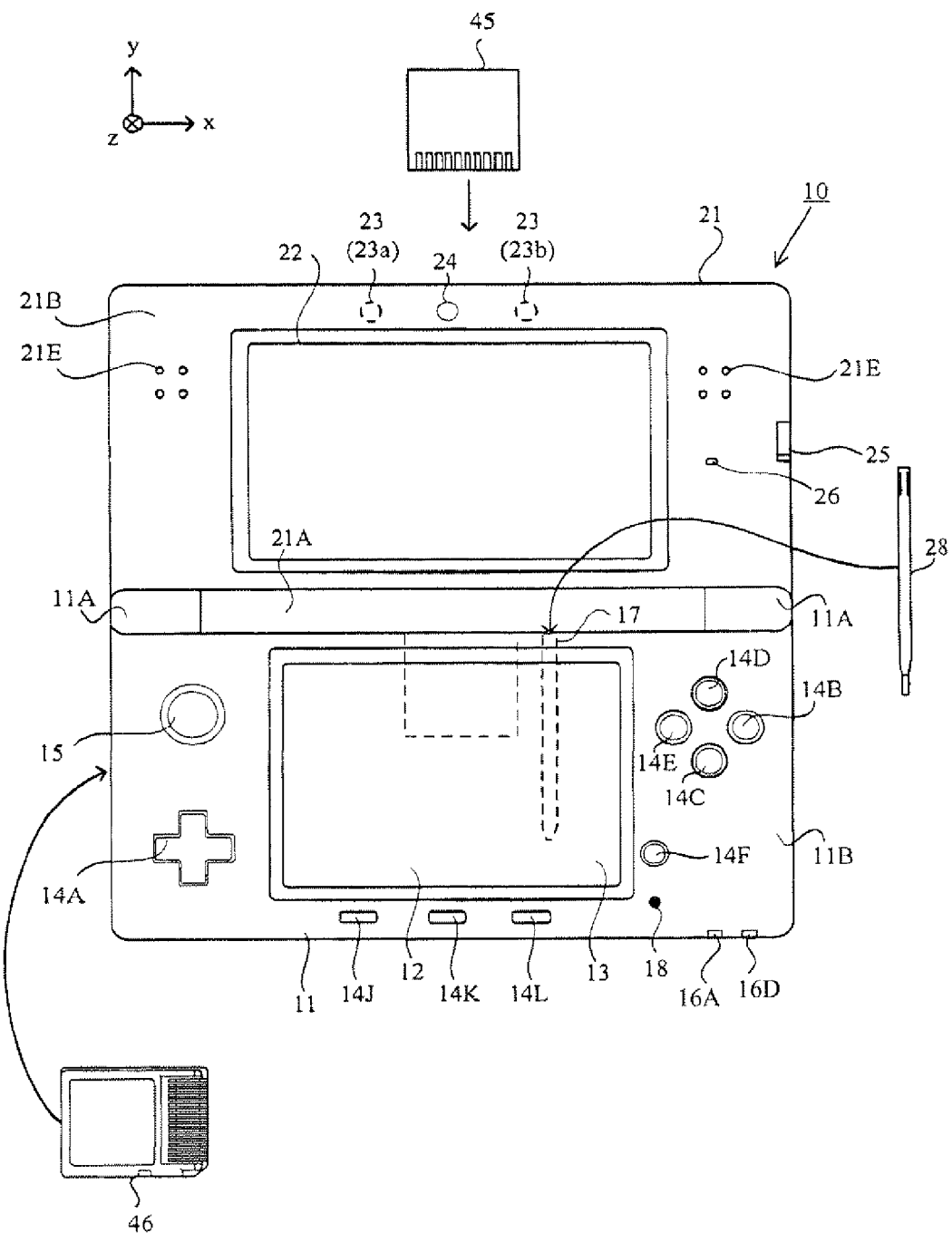
FIG. 1 is a front view showing an example of a game apparatus 10 in an open state.

A description is given of a specific example of an image processing apparatus that executes an image processing program according to an embodiment of the present system. The following embodiment, however, is merely illustrative, and the present system is not limited to the configuration of the following embodiment.

It should be noted that in the following embodiment, data processed by a computer is illustrated using graphs and natural language. More specifically, however, the data is specified by computer-recognizable pseudo-language, commands, parameters, machine language, arrays, and the like. The present embodiment does not limit the method of representing the data.

First, with reference to the drawings, a description is given of a hand-held game apparatus 10 as an example of the image processing apparatus that executes the image processing program according to the present embodiment. The image processing apparatus according to the present system, however, is not limited to a game apparatus. The image processing apparatus according to the present system may be a given computer system, such as a general-purpose computer. The image processing apparatus may also not be limited to a portable electronic gaming device and may be implemented on a home entertainment gaming device, such as the Nintendo Wii (including e.g., Wii MotionPlus attachment having gyroscope sensors), for example. A description of an example home entertainment gaming device can be found in U.S. application Ser. No. 12/222,873 (U.S. Patent Publication No. 2009/0181736) which is hereby incorporated by reference. The home entertainment gaming device can be played, for example, on a standard television, on a 3-D television, or even on a holographic television.

It should be noted that the image processing program according to the present embodiment is a game program. The image processing program according to the present system, however, is not limited to a game program. The image processing program according to the present system can be applied by being executed by a given computer system. Further, the processes of the present embodiment may be subjected to distributed processing by a plurality of networked devices, or may be performed by a network system where, after main processes are performed by a server, the process results are distributed to terminals, or may be performed by a so-called cloud network.

FIGS. 1, 2, 3A, 3B, 3C, and 3D are each a plan view showing an example of the appearance of the game apparatus 10. The game apparatus 10 shown in FIGS. 1 through 3D includes a capturing section (camera), and therefore is capable of capturing an image with the capturing section, displaying the captured image on a screen, and storing data of the captured image. Further, the game apparatus 10 is capable of executing a game program stored in an exchangeable memory card, or a game program received from a server or another game apparatus via a network. The game apparatus 10 is also capable of displaying on the screen an image generated by computer graphics processing, such as an image captured by a virtual camera set in a virtual space. It should be noted that in the present specification, the act of obtaining image data with the camera is described as "capturing", and the act of storing the image data of the captured image is described as "photographing".

Figure 2:
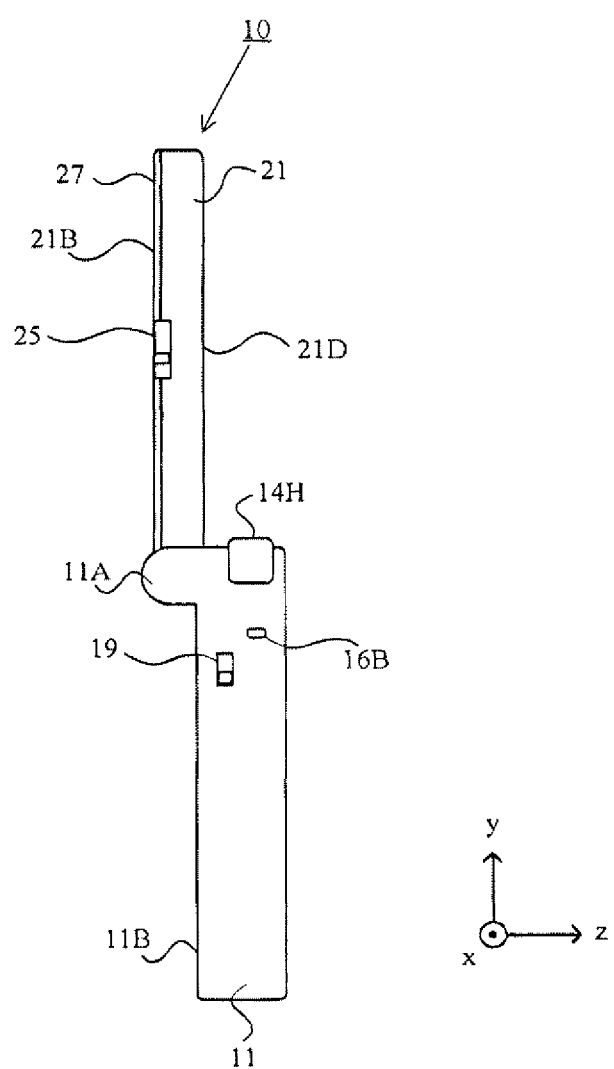
FIG. 2 is a side view showing an example of the game apparatus 10 in the open state.
Figure 3:
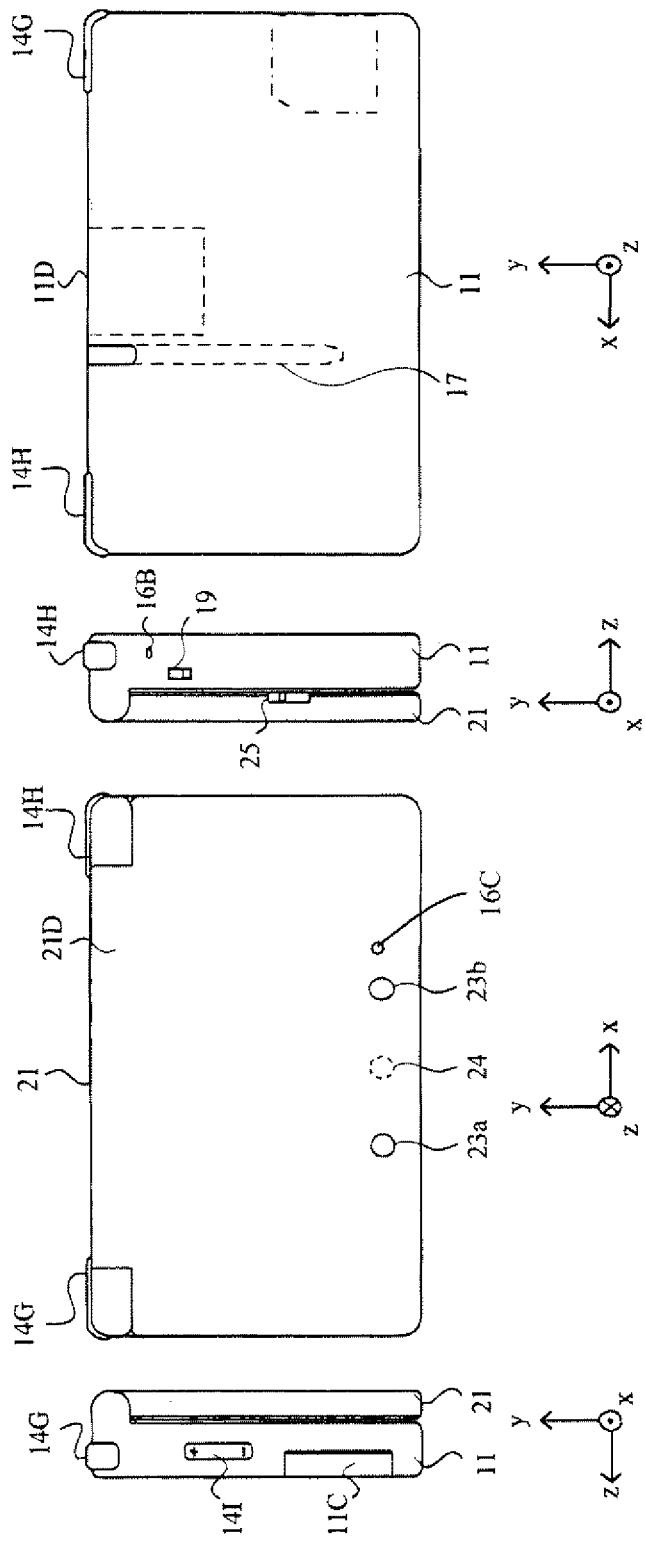
FIG. 3A is a left side view showing an example of the game apparatus 10 in a closed state.
FIG. 3B is a front view showing an example of the game apparatus 10 in the closed state.
FIG. 3C is a right side view showing an example of the game apparatus 10 in the closed state.
FIG. 3D is a rear view showing an example of the game apparatus 10 in the closed state.

The game apparatus 10 shown in FIGS. 1 through 3D includes a lower housing 11 and an upper housing 21. The lower housing 11 and the upper housing 21 are joined together by a hinge structure so as to be openable and closable in a folding manner (foldable). That is, the upper housing 21 is attached to the lower housing 11 so as to be rotatable (pivotable) relative to the lower housing 11. Thus, the game apparatus 10 has the following two forms: a closed state where the upper housing 21 is in firm contact with the lower housing 11, as seen for example in FIGS. 3A and 3C; and a state where the upper housing 21 has rotated relative to the lower housing 11 such that the state of firm contact is released (an open state). The rotation of the upper housing 21 is allowed to the position where, as shown in FIG. 2, the upper housing 21 and the lower housing 11 are approximately parallel to each other in the open state (see FIG. 2).

FIG. 1 is a front view showing an example of the game apparatus 10 being open (in the open state). A planar shape of each of the lower housing 11 and the upper housing 21 is a wider-than-high rectangular plate-like shape having a longitudinal direction (horizontal direction (left-right direction): an x-direction in FIG. 1) and a transverse direction ((up-down direction): a y-direction in FIG. 1). The lower housing 11 and the upper housing 21 are joined together at the longitudinal upper outer edge of the lower housing 11 and the longitudinal lower outer edge of the upper housing 21 by a hinge structure so as to be rotatable relative to each other. Normally, a user uses the game apparatus 10 in the open state. The user stores away the game apparatus 10 in the closed state. Further, the upper housing 21 can maintain the state of being stationary at a desired angle formed between the lower housing 11 and the upper housing 21 due, for example, to a frictional force generated at the connecting part between the lower housing 11 and the upper housing 21. That is, the game apparatus 10 can maintain the upper housing 21 stationary at a desired angle with respect to the lower housing 11. Generally, in view of the visibility of a screen provided in the upper housing 21, the upper housing 21 is open at a right angle or an obtuse angle with the lower housing 11. Hereinafter, in the closed state of the game apparatus 10, the respective opposing surfaces of the upper housing 21 and the lower housing 11 are referred to as "inner surfaces" or "main surfaces." Further, the surfaces opposite to the respective inner surfaces (main surfaces) of the upper housing 21 and the lower housing 11 are referred to as "outer surfaces".

Projections 11A are provided at the upper long side portion of the lower housing 11, each projection 11A projecting perpendicularly (in a z-direction in FIG. 1) to an inner surface (main surface) 11B of the lower housing 11. A projection (bearing) 21A is provided at the lower long side portion of the upper housing 21, the projection 21A projecting perpendicularly to the lower side surface of the upper housing 21 from the lower side surface of the upper housing 21. Within the projections 11A and 21A, for example, a rotating shaft (not shown) is accommodated so as to extend in the x-direction from one of the projections 11A through the projection 21A to the other projection 11A. The upper housing 21 is freely rotatable about the rotating shaft, relative to the lower housing 11. Thus, the lower housing 11 and the upper housing 21 are connected together in a foldable manner.

The inner surface 11B of the lower housing 11 shown in FIG. 1 includes a lower liquid crystal display (LCD) 12, a touch panel 13, operation buttons 14A through 14L, an analog stick 15, a first LED 16A, a fourth LED 16D, and a microphone hole 18.

The lower LCD 12 is accommodated in the lower housing 11. A planar shape of the lower LCD 12 is a wider-than-high rectangle, and is placed such that the long side direction of the lower LCD 12 coincides with the longitudinal direction of the lower housing 11 (the x-direction in FIG. 1). The lower LCD 12 is provided in the center of the inner surface (main surface) of the lower housing 11. The screen of the lower LCD 12 is exposed through an opening of the inner surface of the lower housing 11. The game apparatus 10 is in the closed state when not used, so that the screen of the lower LCD 12 is prevented from being soiled or damaged. As an example, the number of pixels of the lower LCD 12 is 320 dots×240 dots (horizontal× vertical). Unlike an upper LCD 22 described later, the lower LCD 12 is a display device that displays an image in a planar manner (not in a stereoscopically visible manner). It should be noted that although an LCD is used as a display device in the first embodiment, any other display device may be used, such as a display device using electroluminescence (EL). Further, a display device having a desired resolution may be used as the lower LCD 12.

The touch panel 13 is one of input devices of the game apparatus 10. The touch panel 13 is mounted so as to cover the screen of the lower LCD 12. In the first embodiment, the touch panel 13 may be, but is not limited to, a resistive touch panel. The touch panel may also be a touch panel of any pressure type, such as an electrostatic capacitance type. In the first embodiment, the touch panel 13 has the same resolution (detection accuracy) as that of the lower LCD 12. The resolutions of the touch panel 13 and the lower LCD 12, however, may not necessarily need to be the same.

The operation buttons 14A through 14L are each an input device for providing a predetermined input. Among the operation buttons 14A through 14L, the cross button 14A (direction input button 14A), the button 14B, the button 14C, the button 14D, the button 14E, the power button 14F, the select button 14J, the home button 14K, and the start button 14L are provided on the inner surface (main surface) of the lower housing 11.

The cross button 14A is cross-shaped, and includes buttons for indicating at least up, down, left, and right directions, respectively. The cross button 14A is provided in a lower area of the area to the left of the lower LCD 12. The cross button 14A is placed so as to be operated by the thumb of a left hand holding the lower housing 11.

The button 14B, the button 14C, the button 14D, and the button 14E are placed in a cross formation in an upper portion of the area to the right of the lower LCD 12. The button 14B, the button 14C, the button 14D, and the button 14E, are placed where the thumb of a right hand holding the lower housing 11 is naturally placed. The power button 14F is placed in a lower portion of the area to the right of the lower LCD 12.

The select button 14J, the home button 14K, and the start button 14L are provided in a lower area of the lower LCD 12. The buttons 14A through 14E, the select button 14J, the home button 14K, and the start button 14L are appropriately assigned functions, respectively, in accordance with the program executed by the game apparatus 10. The cross button 14A is used for, for example, a selection operation and a moving operation of a character during a game. The operation buttons 14B through 14E are used, for example, for a determination operation or a cancellation operation. The power button 14F can be used to power on/off the game apparatus 10. In another embodiment, the power button 14F can be used to indicate to the game apparatus 10 that it should enter a "sleep mode" for power saving purposes.

The analog stick 15 is a device for indicating a direction. The analog stick 15 is provided to an upper portion of the area to the left of the lower LCD 12 of the inner surface (main surface) of the lower housing 11. That is, the analog stick 15 is provided above the cross button 14A. The analog stick 15 is placed so as to be operated by the thumb of a left hand holding the lower housing 11. The provision of the analog stick 15 in the upper area places the analog stick 15 at the position where the thumb of the left hand of the user holding the lower housing 11 is naturally placed. The cross button 14A is placed at the position where the thumb of the left hand holding the lower housing 11 is moved slightly downward. This enables the user to operate the analog stick 15 and the cross button 14A by moving up and down the thumb of the left hand holding the lower housing 11. The key top of the analog stick 15 is configured to slide parallel to the inner surface of the lower housing 11. The analog stick 15 functions in accordance with the program executed by the game apparatus 10. When, for example, the game apparatus 10 executes a game where a predetermined object appears in a three-dimensional virtual space, the analog stick 15 functions as an input device for moving the predetermined object in the three-dimensional virtual space. In this case, the predetermined object is moved in the direction in which the key top of the analog stick 15 has slid. It should be noted that the analog stick 15 may be a component capable of providing an analog input by being tilted by a predetermined amount in any one of up, down, right, left, and diagonal directions.

It should be noted that the four buttons, namely the button 14B, the button 14C, the button 14D, and the button 14E, and the analog stick 15 are placed symmetrically to each other with respect to the lower LCD 12. This also enables, for example, a left-handed person to provide a direction indication input using these four buttons, namely the button 14B, the button 14C, the button 14D, and the button 14E, depending on the game program.

The first LED 16A (FIG. 1) notifies the user of the on/off state of the power supply of the game apparatus 10. The first LED 16A is provided on the right of an end portion shared by the inner surface (main surface) of the lower housing 11 and the lower side surface of the lower housing 11. This enables the user to view whether or not the first LED 16A is lit on, regardless of the open/closed state of the game apparatus 10. The fourth LED 16D (FIG. 1) notifies the user that the game apparatus 10 is recharging and is located near the first LED 16A.

The microphone hole 18 is a hole for a microphone built into the game apparatus 10 as a sound input device. The built-in microphone detects a sound from outside the game apparatus 10 through the microphone hole 18. The microphone and the microphone hole 18 are provided below the power button 14F on the inner surface (main surface) of the lower housing 11.

The upper side surface of the lower housing 11 includes an opening 17 (a dashed line shown in FIGS. 1 and 3D) for a stylus 28. The opening 17 can accommodate the stylus 28 that is used to perform an operation on the touch panel 13. It should be noted that, normally, an input is provided to the touch panel 13 using the stylus 28. The touch panel 13, however, can be operated not only by the stylus 28 but also by a finger of the user.

The upper side surface of the lower housing 11 includes an insertion slot 11D (a dashed line shown in FIGS. 1 and 3D), into which an external memory 45 having a game program stored thereon is to be inserted. Within the insertion slot 11D, a connector (not shown) is provided for electrically connecting the game apparatus 10 and the external memory 45 in a detachable manner. The connection of the external memory 45 to the game apparatus 10 causes a processor included in internal circuitry to execute a predetermined game program. It should be noted that the connector and the insertion slot 11D may be provided on another side surface (e.g., the right side surface) of the lower housing 11.

The inner surface 21B of the upper housing 21 shown in FIG. 1 includes loudspeaker holes 21E, an upper LCD 22, an inner capturing section 24, a 3D adjustment switch 25, and a 3D indicator 26 are provided. The inner capturing section 24 is an example of a first capturing device.

The upper LCD 22 is a display device capable of displaying a stereoscopically visible image. The upper LCD 22 is capable of displaying a left-eye image and a right-eye image, using substantially the same display area. Specifically, the upper LCD 22 is a display device using a method in which the left-eye image and the right-eye image are displayed alternately in the horizontal direction in predetermined units (e.g., in every other line). It should be noted that the upper LCD 22 may be a display device using a method in which the left-eye image and the right-eye image are displayed alternately for a predetermined time. Further, the upper LCD 22 is a display device capable of displaying an image stereoscopically visible with the naked eye. In this case, a lenticular type display device or a parallax barrier type display device is used so that the left-eye image and the right-eye image that are displayed alternately in the horizontal direction can be viewed separately with the left eye and the right eye, respectively. In the first embodiment, the upper LCD 22 is a parallax-barrier-type display device. The upper LCD 22 displays an image stereoscopically visible with the naked eye (a stereoscopic image), using the right-eye image and the left-eye image. That is, the upper LCD 22 allows the user to view the left-eye image with their left eye, and the right-eye image with their right eye, using the parallax barrier. This makes it possible to display a stereoscopic image giving the user a stereoscopic effect (stereoscopically visible image). Furthermore, the upper LCD 22 is capable of disabling the parallax barrier. When disabling the parallax barrier, the upper LCD 22 is capable of displaying an image in a planar manner (the upper LCD 22 is capable of displaying a planar view image, as opposed to the stereoscopically visible image described above. This is a display mode in which the same displayed image can be viewed with both the left and right eyes). Thus, the upper LCD 22 is a display device capable of switching between: the stereoscopic display mode for displaying a stereoscopically visible image; and the planar display mode for displaying an image in a planar manner (displaying a planar view image). The switching of the display modes is performed by the 3D adjustment switch 25 described later.

The upper LCD 22 is accommodated in the upper housing 21. A planar shape of the upper LCD 22 is a wider-than-high rectangle, and is placed at the center of the upper housing 21 such that the long side direction of the upper LCD 22 coincides with the long side direction of the upper housing 21. As an example, the area of the screen of the upper LCD 22 is set greater than that of the lower LCD 12. Specifically, the screen of the upper LCD 22 is set horizontally longer than the screen of the lower LCD 12. That is, the proportion of the width in the aspect ratio of the screen of the upper LCD 22 is set greater than that of the lower LCD 12. The screen of the upper LCD 22 is provided on the inner surface (main surface) 21B of the upper housing 21, and is exposed through an opening of the inner surface of the upper housing 21. Further, the inner surface of the upper housing 21 is covered by a transparent screen cover 27. The screen cover 27 protects the screen of the upper LCD 22, and integrates the upper LCD 22 and the inner surface of the upper housing 21, and thereby provides unity. As an example, the number of pixels of the upper LCD 22 is 800 dots×240 dots (horizontal×vertical). It should be noted that an LCD is used as the upper LCD 22 in the first embodiment. The upper LCD 22, however, is not limited to this, and a display device using EL or the like may be used. Furthermore, a display device having any resolution may be used as the upper LCD 22.

The loudspeaker holes 21E are holes through which sounds from loudspeakers 44 that serve as a sound output device of the game apparatus 10 are output. The loudspeakers holes 21E are placed symmetrically with respect to the upper LCD. Sounds from the loudspeakers 44 described later are output through the loudspeaker holes 21E.

The inner capturing section 24 functions as a capturing section having an imaging direction that is the same as the inward normal direction of the inner surface 21B of the upper housing 21. The inner capturing section 24 includes an imaging device having a predetermined resolution, and a lens. The lens may have a zoom mechanism.

The inner capturing section 24 is placed: on the inner surface 21B of the upper housing 21; above the upper edge of the screen of the upper LCD 22; and in the center of the upper housing 21 in the left-right direction (on the line dividing the upper housing 21 (the screen of the upper LCD 22) into two equal left and right portions). Such a placement of the inner capturing section 24 makes it possible that when the user views the upper LCD 22 from the front thereof, the inner capturing section 24 captures the user's face from the front thereof. A left outer capturing section 23a and a right outer capturing section 23b will be described later.

The 3D adjustment switch 25 is a slide switch, and is used to switch the display modes of the upper LCD 22 as described above. The 3D adjustment switch 25 is also used to adjust the stereoscopic effect of a stereoscopically visible image (stereoscopic image) displayed on the upper LCD 22. The 3D adjustment switch 25 is provided at an end portion shared by the inner surface and the right side surface of the upper housing 21, so as to be visible to the user, regardless of the open/closed state of the game apparatus 10. The 3D adjustment switch 25 includes a slider that is slidable to any position in a predetermined direction (e.g., the up-down direction), and the display mode of the upper LCD 22 is set in accordance with the position of the slider.

When, for example, the slider of the 3D adjustment switch 25 is placed at the lowermost position, the upper LCD 22 is set to the planar display mode, and a planar image is displayed on the screen of the upper LCD 22. It should be noted that the same image may be used as the left-eye image and the right-eye image, while the upper LCD 22 remains set to the stereoscopic display mode, and thereby performs planar display. On the other hand, when the slider is placed above the lowermost position, the upper LCD 22 is set to the stereoscopic display mode. In this case, a stereoscopically visible image is displayed on the screen of the upper LCD 22. When the slider is placed above the lowermost position, the visibility of the stereoscopic image is adjusted in accordance with the position of the slider. Specifically, the amount of deviation in the horizontal direction between the position of the right-eye image and the position of the left-eye image is adjusted in accordance with the position of the slider.

The 3D indicator 26 indicates whether or not the upper LCD 22 is in the stereoscopic display mode. For example, the 3D indicator 26 is an LED, and is lit on when the stereoscopic display mode of the upper LCD 22 is enabled. The 3D indicator 26 is placed on the inner surface 21B of the upper housing 21 near the screen of the upper LCD 22. Accordingly, when the user views the screen of the upper LCD 22 from the front thereof, the user can easily view the 3D indicator 26. This enables the user to easily recognize the display mode of the upper LCD 22 even when viewing the screen of the upper LCD 22.

FIG. 2 is a right side view showing an example of the game apparatus 10 in the open state. The right side surface of the lower housing 11 includes a second LED 16B, a wireless switch 19, and the R button 14H. The second LED 16B notifies the user of the establishment state of the wireless communication of the game apparatus 10. The game apparatus 10 is capable of wirelessly communicating with other devices, and the second LED 16B is lit on when wireless communication is established between the game apparatus 10 and other devices. The game apparatus 10 has the function of establishing connection with a wireless LAN by, for example, a method based on the IEEE 802.11.b/g standard. The wireless switch 19 enables/disables the function of the wireless communication. The R button 14H will be described later.

FIG. 3A is a left side view showing an example of the game apparatus 10 being closed (in the closed state). The left side surface of the lower housing 11 shown in FIG. 3A includes an openable and closable cover section 11C, the L button 14H, and the sound volume button 14I. The sound volume button 14I is used to adjust the sound volume of the loudspeakers of the game apparatus 10.

Within the cover section 11C, a connector (not shown) is provided for electrically connecting the game apparatus 10 and a data storage external memory 46 (see FIG. 1). The data storage external memory 46 is detachably attached to the connector. The data storage external memory 46 is used to, for example, store (save) data of an image captured by the game apparatus 10. It should be noted that the connector and the cover section 11C may be provided on the right side surface of the lower housing 11. The L button 14G will be described later.

FIG. 3B is a front view showing an example of the game apparatus 10 in the closed state. The outer surface of the upper housing 21 shown in FIG. 3B includes a left outer capturing section 23a, a right outer capturing section 23b, and a third LED 16c.

The left outer capturing section 23a and the right outer capturing section 23b each includes an imaging device (e.g., a CCD image sensor or a CMOS image sensor) having a predetermined common resolution, and a lens. The lens may have a zoom mechanism. The imaging directions of the left outer capturing section 23a and the right outer capturing section 23b (the optical axis of the camera) are each the same as the outward normal direction of the outer surface 21D. That is, the imaging direction of the left outer capturing section 23a and the imaging direction of the right outer capturing section 23b are parallel to each other. Hereinafter, the left outer capturing section 23a and the right outer capturing section 23b are collectively referred to as an "outer capturing section 23". The outer capturing section 23 is an example of a second capturing device.

The left outer capturing section 23a and the right outer capturing section 23b included in the outer capturing section 23 are placed along the horizontal direction of the screen of the upper LCD 22. That is, the left outer capturing section 23a and the right outer capturing section 23b are placed such that a straight line connecting between the left outer capturing section 23a and the right outer capturing section 23b is placed along the horizontal direction of the screen of the upper LCD 22. When the user has pivoted the upper housing 21 at a predetermined angle (e.g., 90°) relative to the lower housing 11, and views the screen of the upper LCD 22 from the front thereof, the left outer capturing section 23a is placed on the left side of the user viewing the screen, and the right outer capturing section 23b is placed on the right side of the user (see FIG. 1). The distance between the left outer capturing section 23a and the right outer capturing section 23b is set to correspond to the distance between both eyes of a person, and may be set, for example, in the range from 30 mm to 70 mm. It should be noted, however, that the distance between the left outer capturing section 23a and the right outer capturing section 23b is not limited to this range. It should be noted that in the first embodiment, the left outer capturing section 23a and the right outer capturing section 23b are fixed to the housing 21, and therefore, the imaging directions cannot be changed.

The left outer capturing section 23a and the right outer capturing section 23b are placed symmetrically with respect to the line dividing the upper LCD 22 (the upper housing 21) into two equal left and right portions. Further, the left outer capturing section 23a and the right outer capturing section 23b are placed in the upper portion of the upper housing 21 and in the back of the portion above the upper edge of the screen of the upper LCD 22, in the state where the upper housing 21 is in the open state (see FIG. 1). That is, the left outer capturing section 23a and the right outer capturing section 23b are placed on the outer surface of the upper housing 21, and, if the upper LCD 22 is projected onto the outer surface of the upper housing 21, is placed above the upper edge of the screen of the projected upper LCD 22.

Thus, the left outer capturing section 23a and the right outer capturing section 23b of the outer capturing section 23 are placed symmetrically with respect to the center line of the upper LCD 22 extending in the transverse direction. This makes it possible that when the user views the upper LCD 22 from the front thereof, the imaging directions of the outer capturing section 23 coincide with the directions of the respective lines of sight of the user's right and left eyes. Further, the outer capturing section 23 is placed in the back of the portion above the upper edge of the screen of the upper LCD 22, and therefore, the outer capturing section 23 and the upper LCD 22 do not interfere with each other inside the upper housing 21. Further, when the inner capturing section 24 provided on the inner surface of the upper housing 21 as shown by a dashed line in FIG. 3B is projected onto the outer surface of the upper housing 21, the left outer capturing section 23a and the right outer capturing section 23b are placed symmetrically with respect to the projected inner capturing section 24. This makes it possible to reduce the upper housing 21 in thickness as compared to the case where the outer capturing section 23 is placed in the back of the screen of the upper LCD 22, or the case where the outer capturing section 23 is placed in the back of the inner capturing section 24.

The left outer capturing section 23a and the right outer capturing section 23b can be used as a stereo camera, depending on the program executed by the game apparatus 10. Alternatively, either one of the two outer capturing sections (the left outer capturing section 23a and the right outer capturing section 23b) may be used solely, so that the outer capturing section 23 can also be used as a non-stereo camera, depending on the program. When a program is executed for causing the left outer capturing section 23a and the right outer capturing section 23b to function as a stereo camera, the left outer capturing section 23a captures a left-eye image, which is to be viewed with the user's left eye, and the right outer capturing section 23b captures a right-eye image, which is to be viewed with the user's right eye. Yet alternatively, depending on the program, images captured by the two outer capturing sections (the left outer capturing section 23*a* and the right outer capturing section 23*b*) may be combined together, or may be used to compensate for each other, so that imaging can be performed with an extended imaging range. Yet alternatively, a left-eye image and a right-eye image that have a parallax may be generated from a single image captured using one of the outer capturing sections 23*a* and 23*b*, and a pseudo-stereo image as if captured by two cameras can be generated. To generate the pseudo-stereo image, it is possible to appropriately set the distance between virtual cameras.

The third LED 16*c* is lit on when the outer capturing section 23 is operating, and informs that the outer capturing section 23 is operating. The third LED 16*c* is provided near the outer capturing section 23 on the outer surface of the upper housing 21.

FIG. 3C is a right side view showing an example of the game apparatus 10 in the closed state. FIG. 3D is a rear view showing an example of the game apparatus 10 in the closed state.

The L button 14G and the R button 14H are provided on the upper side surface of the lower housing 11 shown in FIG. 3D. The L button 14G is provided at the left end portion of the upper side surface of the lower housing 11, and the R button 14H is provided at the right end portion of the upper side surface of the lower housing 11. The L button 14G and the R button 14H are appropriately assigned functions, respectively, in accordance with the program executed by the game apparatus 10. For example, the L button 14G and the R button 14H function as shutter buttons (capturing instruction buttons) of the capturing sections described above.

It should be noted that although not shown in the figures, a rechargeable battery that serves as the power supply of the game apparatus 10 is accommodated in the lower housing 11, and the battery can be charged through a terminal provided on the side surface (e.g., the upper side surface) of the lower housing 11.

Figure 4:
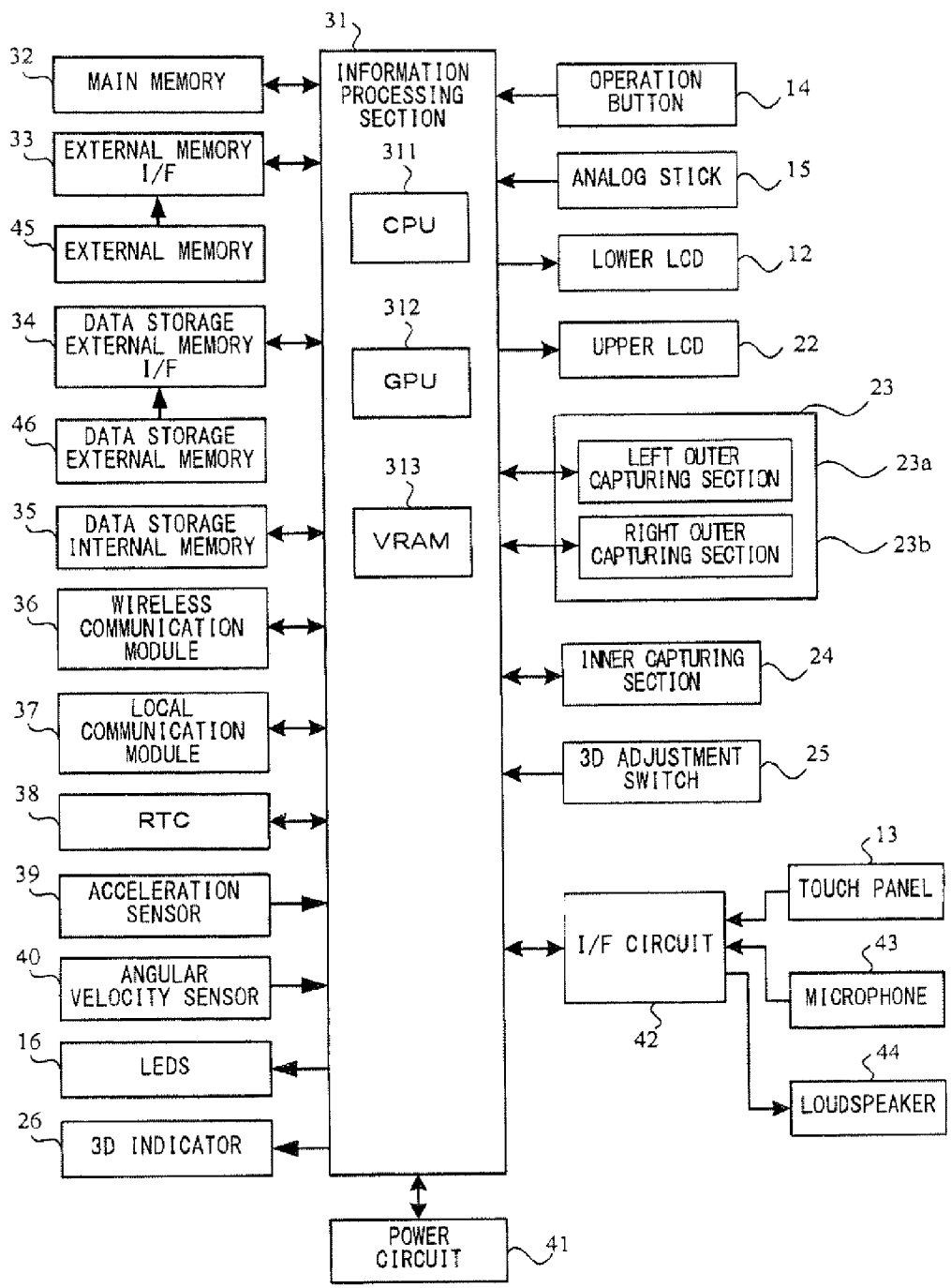
FIG. 4 is a block diagram showing an example of the internal configuration of the game apparatus 10.

FIG. 4 is a block diagram showing an example of the internal configuration of the game apparatus 10. The game apparatus 10 includes, as well as the components described above, electronic components, such as an information processing section 31, a main memory 32, an external memory interface (external memory I/F) 33, a data storage external memory I/F 34, a data storage internal memory 35, a wireless communication module 36, a local communication module 37, a real-time clock (RTC) 38, an acceleration sensor 39, an angular velocity sensor 40, a power circuit 41, and an interface circuit (I/F circuit) 42. These electronic components are mounted on electronic circuit boards, and are accommodated in the lower housing 11, or may be accommodated in the upper housing 21.

The information processing section 31 is information processing means including a central processing unit (CPU) 311 that executes a predetermined program, a graphics processing unit (GPU) 312 that performs image processing, and the like. In the first embodiment, a predetermined program is stored in a memory (e.g., the external memory 45 connected to the external memory I/F 33, or the data storage internal memory 35) included in the game apparatus 10. The CPU 311 of the information processing section 31 executes the predetermined program, and thereby performs the image processing described later or game processing. It should be noted that the program executed by the CPU 311 of the information processing section 31 may be acquired from another device by communication with said another device. The information processing section 31 further includes a video RAM (VRAM) 313. The GPU 312 of the information processing section 31 generates an image in accordance with an instruction from the CPU 311 of the information processing section 31, and draws the image in the VRAM 313. The GPU 312 of the information processing section 31 outputs the image drawn in the VRAM 313 to the upper LCD 22 and/or the lower LCD 12, and the image is displayed on the upper LCD 22 and/or the lower LCD 12.

To the information processing section 31, the main memory 32, the external memory I/F 33, the data storage external memory I/F 34, and the data storage internal memory 35 are connected. The external memory I/F 33 is an interface for establishing a detachable connection with the external memory 45. The data storage external memory I/F 34 is an interface for establishing a detachable connection with the data storage external memory 46.

The main memory 32 is volatile storage means used as a work area or a buffer area of the information processing section 31 (the CPU 311). That is, the main memory 32 temporarily stores various types of data used for image processing or game processing, and also temporarily stores a program acquired from outside (the external memory 45, another device, or the like) the game apparatus 10. In the first embodiment, the main memory 32 is, for example, a pseudo SRAM (PSRAM).

The external memory 45 is nonvolatile storage means for storing the program executed by the information processing section 31. The external memory 45 is composed of, for example, a read-only semiconductor memory. When the external memory 45 is connected to the external memory I/F 33, the information processing section 31 can load a program stored in the external memory 45. In accordance with the execution of the program loaded by the information processing section 31, a predetermined process is performed. The data storage external memory 46 is composed of a readable/writable non-volatile memory (e.g., a NAND flash memory), and is used to store predetermined data. For example, the data storage external memory 46 stores images captured by the outer capturing section 23 and/or images captured by another device. When the data storage external memory 46 is connected to the data storage external memory I/F 34, the information processing section 31 loads an image stored in the data storage external memory 46, and the image can be displayed on the upper LCD 22 and/or the lower LCD 12.

The data storage internal memory 35 is composed of a readable/writable non-volatile memory (e.g., a NAND flash memory), and is used to store predetermined data. For example, the data storage internal memory 35 stores data and/or programs downloaded by wireless communication through the wireless communication module 36.

The wireless communication module 36 has the function of establishing connection with a wireless LAN by, for example, a method based on the IEEE 802.11.b/g standard. Further, the local communication module 37 has the function of wirelessly communicating with another game apparatus of the same type by a predetermined communication method (e.g., infrared communication). The wireless communication module 36 and the local communication module 37 are connected to the information processing section 31. The information processing section 31 is capable of transmitting and receiving data to and from another device via the Internet, using the wireless communication module 36, and is capable of transmitting and receiving data to and from another game apparatus of the same type, using the local communication module 37.

The acceleration sensor 39 is connected to the information processing section 31. The acceleration sensor 39 can detect the magnitudes of accelerations (linear accelerations) in the directions of straight lines along three axial (x, y, and z axes in the present embodiment) directions, respectively. The acceleration sensor 39 is provided, for example, within the lower housing 11. As shown in FIG. 1, the long side direction of the lower housing 11 is defined as an x-axis direction; the short side direction of the lower housing 11 is defined as a y-axis direction; and the direction perpendicular to the inner surface (main surface) of the lower housing 11 is defined as a z-axis direction. The acceleration sensor 39 thus detects the magnitudes of the linear accelerations produced in the respective axial directions. It should be noted that the acceleration sensor 39 is, for example, an electrostatic capacitance type acceleration sensor, but may be an acceleration sensor of another type. Further, the acceleration sensor 39 may be an acceleration sensor for detecting an acceleration in one axial direction, or accelerations in two axial directions. The information processing section 31 receives data indicating the accelerations detected by the acceleration sensor 39 (acceleration data), and calculates the orientation and the motion of the game apparatus 10.

The angular velocity sensor 40 is connected to the information processing section 31. The angular velocity sensor 40 detects angular velocities generated about three axes (x, y, and z axes in the present embodiment) of the game apparatus 10, respectively, and outputs data indicating the detected angular velocities (angular velocity data) to the information processing section 31. The angular velocity sensor 40 is provided, for example, within the lower housing 11. The information processing section 31 receives the angular velocity data output from the angular velocity sensor 40, and calculates the orientation and the motion of the game apparatus 10.

The RTC 38 and the power circuit 41 are connected to the information processing section 31. The RTC 38 counts time, and outputs the counted time to the information processing section 31. The information processing section 31 calculates the current time (date) based on the time counted by the RTC 38. The power circuit 41 controls the power from the power supply (the rechargeable battery accommodated in the lower housing 11, which is described above) of the game apparatus 10, and supplies power to each component of the game apparatus 10.

The I/F circuit 42 is connected to the information processing section 31. A microphone 43, a loudspeaker 44, and the touch panel 13 are connected to the I/F circuit 42. Specifically, the loudspeaker 44 is connected to the I/F circuit 42 through an amplifier not shown in the figures. The microphone 43 detects a sound from the user, and outputs a sound signal to the I/F circuit 42. The amplifier amplifies the sound signal from the I/F circuit 42, and outputs the sound from the loudspeaker 44. The I/F circuit 42 includes: a sound control circuit that controls the microphone 43 and the loudspeaker 44 (amplifier); and a touch panel control circuit that controls the touch panel 13. For example, the sound control circuit performs A/D conversion and D/A conversion on the sound signal, and converts the sound signal to sound data in a predetermined format. The touch panel control circuit generates touch position data in a predetermined format, based on a signal from the touch panel 13, and outputs the touch position data to the information processing section 31. The touch position data indicates the coordinates of the position (touch position), on the input surface of the touch panel 13, at which an input has been provided. It should be noted that the touch panel control circuit reads a signal from the touch panel 13, and generates the touch position data, once in a predetermined time. The information processing section 31 acquires the touch position data, and thereby recognizes the touch position, at which the input has been provided on the touch panel 13.

An operation button 14 includes the operation buttons 14A through 14L described above, and is connected to the information processing section 31. Operation data is output from the operation button 14 to the information processing section 31, the operation data indicating the states of inputs provided to the respective operation buttons 14A through 14I (indicating whether or not the operation buttons 14A through 14I have been pressed). The information processing section 31 acquires the operation data from the operation button 14, and thereby performs processes in accordance with the inputs provided to the operation button 14.

The lower LCD 12 and the upper LCD 22 are connected to the information processing section 31. The lower LCD 12 and the upper LCD 22 each display an image in accordance with an instruction from the information processing section 31 (the GPU 312). In the first embodiment, the information processing section 31 causes the lower LCD 12 to display an image for a hand-drawn image input operation, and causes the upper LCD 22 to display an image acquired from either one of the outer capturing section 23 and the inner capturing section 24. That is, for example, the information processing section 31 causes the upper LCD 22 to display a stereoscopic image (stereoscopically visible image) using a right-eye image and a left-eye image that are captured by the inner capturing section 24, or causes the upper LCD 22 to display a planar image using one of a right-eye image and a left-eye image that are captured by the outer capturing section 23.

Specifically, the information processing section 31 is connected to an LCD controller (not shown) of the upper LCD 22, and causes the LCD controller to set the parallax barrier to on/off. When the parallax barrier is on in the upper LCD 22, a right-eye image and a left-eye image that are stored in the VRAM 313 of the information processing section 31 (that are captured by the outer capturing section 23) are output to the upper LCD 22. More specifically, the LCD controller repeatedly alternates the reading of pixel data of the right-eye image for one line in the vertical direction, and the reading of pixel data of the left-eye image for one line in the vertical direction, and thereby reads the right-eye image and the left-eye image from the VRAM 313. Thus, the right-eye image and the left-eye image are each divided into strip images, each of which has one line of pixels placed in the vertical direction, and an image including the divided left-eye strip images and the divided right-eye strip images alternately placed is displayed on the screen of the upper LCD 22. The user views the images through the parallax barrier of the upper LCD 22, whereby the right-eye image is viewed with the user's right eye, and the left-eye image is viewed with the user's left eye. This causes the stereoscopically visible image to be displayed on the screen of the upper LCD 22.

The outer capturing section 23 and the inner capturing section 24 are connected to the information processing section 31. The outer capturing section 23 and the inner capturing section 24 each capture an image in accordance with an instruction from the information processing section 31, and output data of the captured image to the information processing section 31. In the first embodiment, the information processing section 31 gives either one of the outer capturing section 23 and the inner capturing section 24 an instruction to capture an image, and the capturing section that has received the instruction captures an image, and transmits data of the captured image to the information processing section 31. Specifically, the user selects the capturing section to be used, through an operation using the touch panel 13 and the operation button 14. The information processing section 31 (the CPU 311) detects that an capturing section has been selected, and the information processing section 31 gives the selected one of the outer capturing section 23 and the inner capturing section 24 an instruction to capture an image.

When started by an instruction from the information processing section 31 (CPU 311), the outer capturing section 23 and the inner capturing section 24 perform capturing at, for example, a speed of 60 images per second. The captured images captured by the outer capturing section 23 and the inner capturing section 24 are sequentially transmitted to the information processing section 31, and displayed on the upper LCD 22 or the lower LCD 12 by the information processing section 31 (GPU 312). When output to the information processing section 31, the captured images are stored in the VRAM 313, are output to the upper LCD 22 or the lower LCD 12, and are deleted at predetermined times. Thus, images are captured at, for example, a speed of 60 images per second, and the captured images are displayed, whereby the game apparatus 10 can display views in the imaging ranges of the outer capturing section 23 and the inner capturing section 24, on the upper LCD 22 of the lower LCD 12 in real time.

The 3D adjustment switch 25 is connected to the information processing section 31. The 3D adjustment switch 25 transmits to the information processing section 31 an electrical signal in accordance with the position of the slider.

The 3D indicator 26 is connected to the information processing section 31. The information processing section 31 controls whether or not the 3D indicator 26 is to be lit on. When, for example, the upper LCD 22 is in the stereoscopic display mode, the information processing section 31 lights on the 3D indicator 26.

Figure 5:
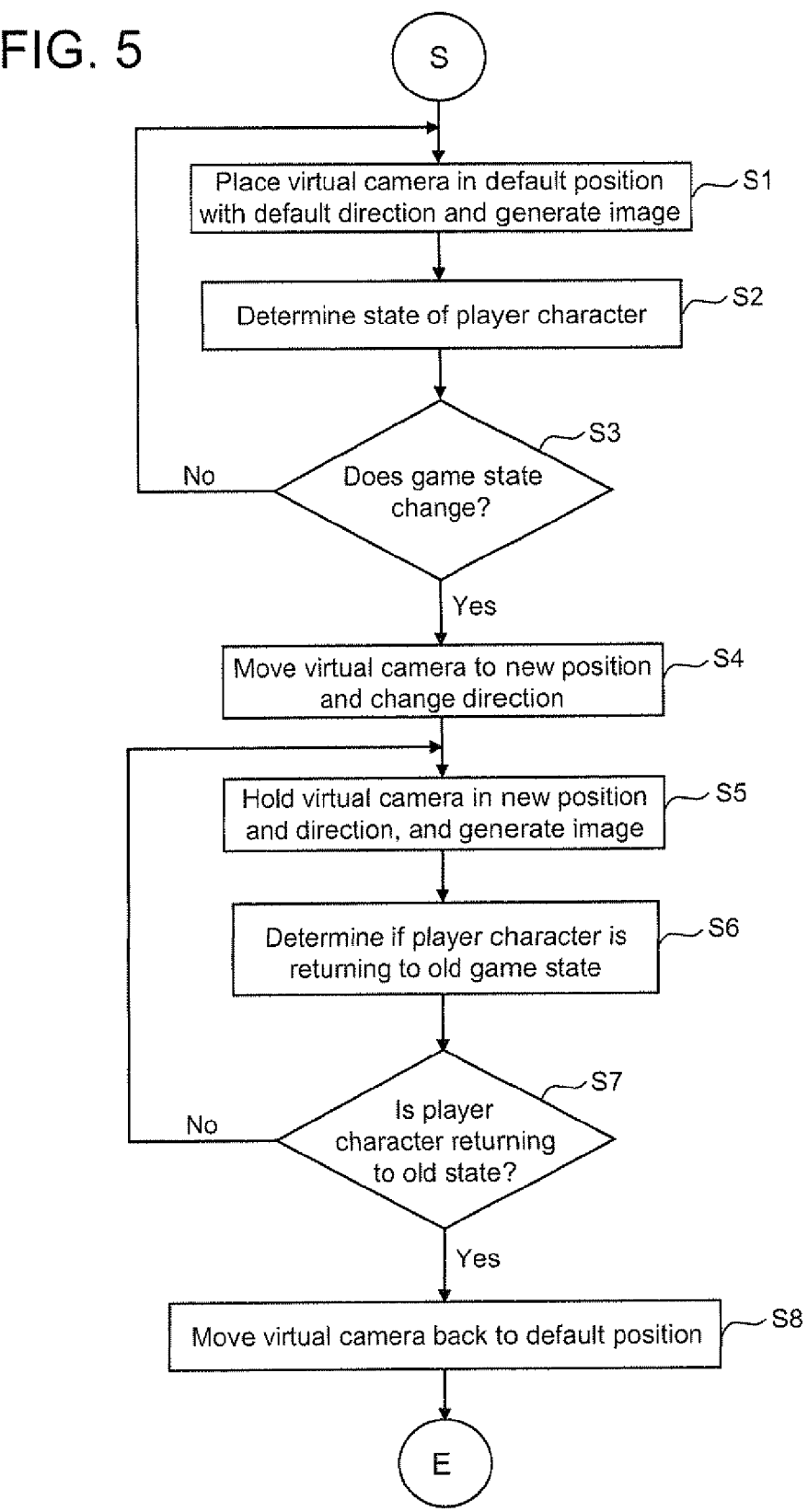
FIG. 5 is an exemplary application flowchart depicting an application process for the present system.

FIG. 5 shows an example of an application flowchart for the virtual camera repositioning system. The system begins in S1 where the virtual camera is positioned in a first, or default state. The default state may include: (i) a default position of the virtual camera and (ii) a default direction (i.e., viewing angle or orientation) of the virtual camera. For example, the virtual camera may remain at substantially "eye-level" (i.e., doll-house view) while the player character is walking in the third person view. An image is generated and displayed (see FIGS. 6, 8A, and 9A) with the virtual camera positioned in the default state.

Once the virtual camera is positioned in a first (default) position and has the first (default) direction, the system proceeds to S2 where it determines the game state of the character. In a default mode, the game state of the character, for example, could be a walking, or standing mode. A change in the game state of the player character, for example, would be from walking to running. If the game state of the player character does not change, the system maintains the camera in the first, or default position, and repeats S2 until the game state changes.

If the game state of the player character changes (e.g., walking to running or standing to running), the system proceeds to S4 where the virtual camera begins moving to a second position. As explained above, the second position of the virtual camera is preferably in a higher position than the first position and the direction of the virtual camera is preferably more downwardly pitched (compare virtual camera VC in FIGS. 6 and 7) so that the player character's footing is made more easily viewable while the player character is running in a third-person view. The position of the virtual camera is raised and the direction (i.e., viewing angle or orientation) is more downwardly pitched simultaneously. As an example, the position may be raised by 10% and the direction may be pitched downwardly by 4° to 8°.

It should be appreciated that the game state may change by a player pressing a button alone. That is, the player character does not actually have to appear as "running" but the game state should change so that the player character should be made to "run" is currently "walking" upon some input or indication by the game. So for example, through the combination of pressing a button and moving the player character (i.e., via a cross-switch), the player character will begin running in a particular direction. However, the button alone may indicate that the player character is entering the "running" state and the game state may change even though the player has not pressed the cross-switch. That is, the game state may change to indicate that the player character should be made to run if currently walking even though the player character is not running in any particular direction because the player has not yet used the cross-switch. As such, the virtual camera will begin moving even though the player character does not appear to be "running" yet on the display.

Once the camera is positioned in the second position, the system proceeds to S5 where it holds the virtual camera in the second position while the player character is running. As mentioned above, the virtual camera views the player character running in the third-person view in such a way to more easily see the player character's footing. Once again, the virtual camera will move upon the indication that the player character is changing state so even if the player character is not yet "running" (i.e. the user has not pressed the cross-switch), the virtual camera will still move based on the indication that the game state is changing. At least one other image is generated and displayed (see FIGS. 7, 8B, and 9B) with the virtual camera having the changed position and direction.

In S6, the system determines if the player character is going to return to its first, or default state (i.e. stop running). If the player character is not returning to its first state (i.e. keeps running), the system returns to S5 where it maintains the virtual camera's position in the second position and second direction.

If the player character returns to its default state, the system proceeds to S8 where the virtual camera begins moving back to the first, or default position. For example, the virtual camera will lower back to a position that is substantially "eye-level" with a third-person view of the player character.

Figure 6:
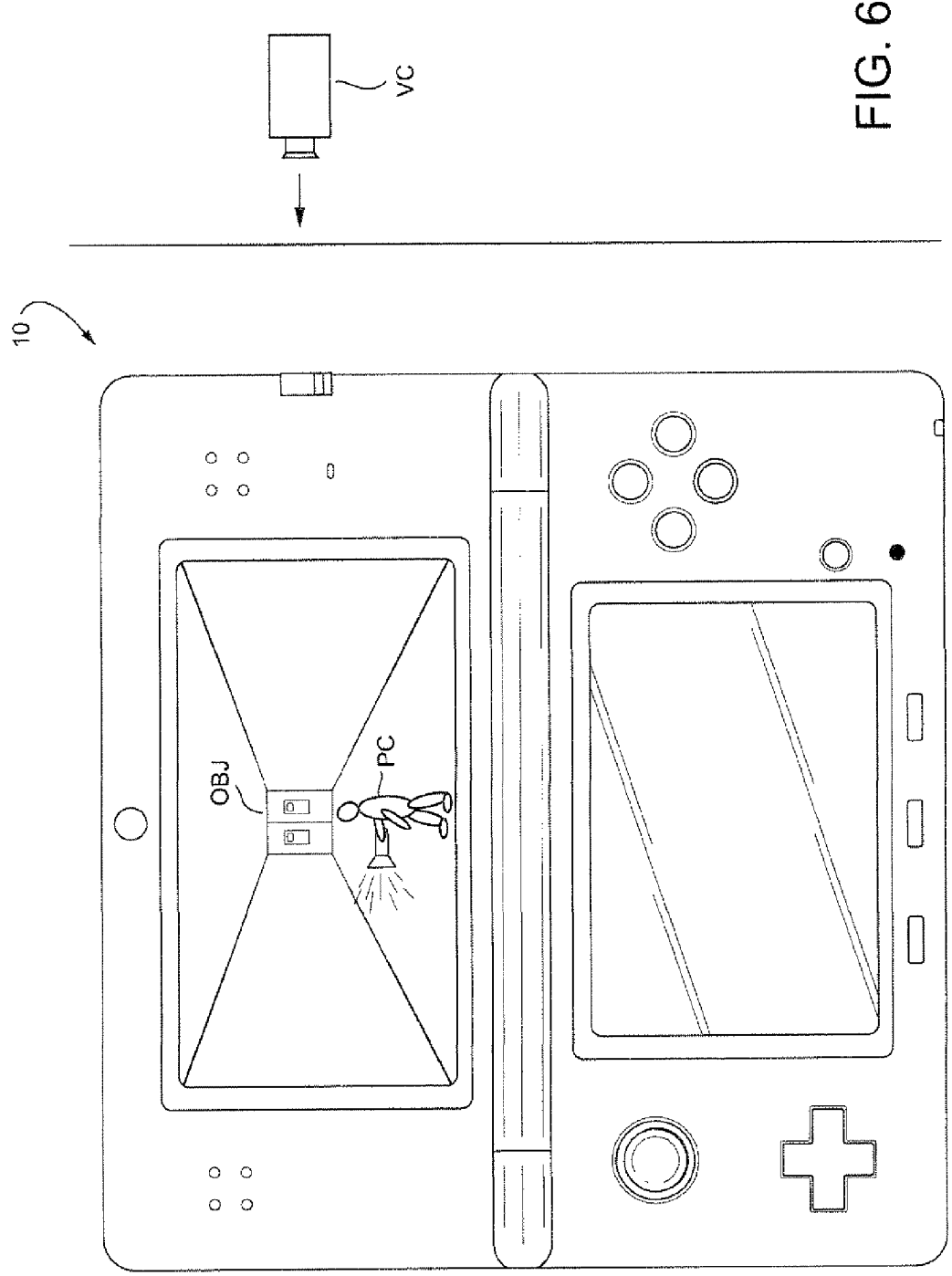
FIG. 6 is an exemplary diagram showing an example implementation of the present system on the game apparatus 10 when the present system is in a first state.

FIG. 6 shows a diagram of an example where the game apparatus 10 is operating in a first, or default state. In this example, the player character PC is walking (or standing) in a hallway where an object OBJ depicted as a door is in the background. The virtual camera VC can be "eye level" with the player character PC in the third person view in the default position. In this example, the player character PC holds a flashlight with the player character PC body facing left.

Figure 7:
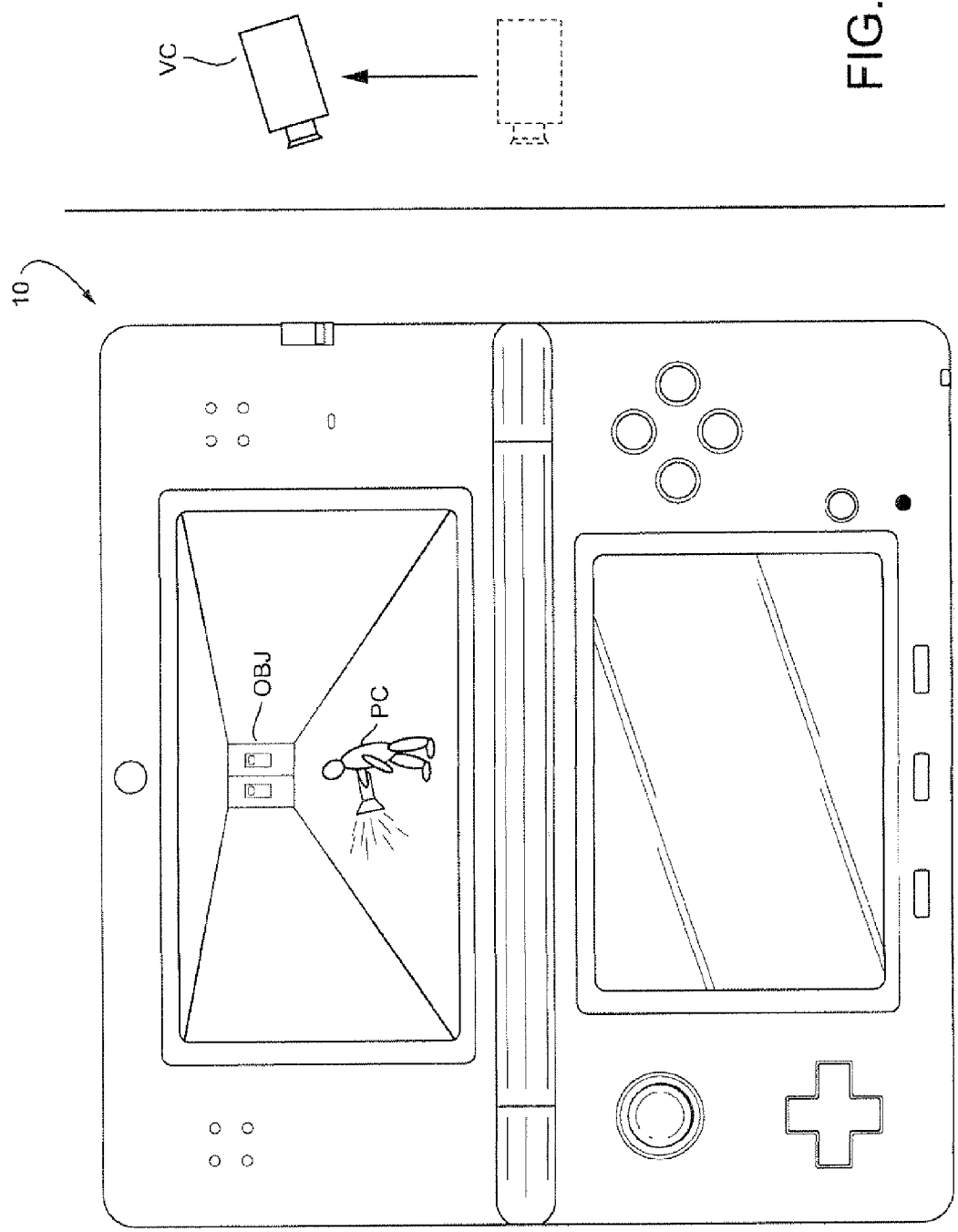
FIG. 7 is an exemplary diagram showing an example implementation of the present system on the game apparatus 10 when the present system is in a second state.

FIG. 7 shows a diagram of an example where the game apparatus 10 is operating in a second state. In this example, the player character PC state has changed from walking to running. This change in state may result from, for example, user manipulation of a particular input (e.g., button, switch, or housing movement) which serves an initiation instruction for the second state and the virtual camera's VC change in position and direction. As can be seen in FIG. 7, the virtual camera VC in this example moves upward so that it is higher than the default "eye level" or "doll house" view. At the same time, the visual direction of the virtual camera VC points downward. The object OBJ in the background is moved upward as the virtual camera is now higher than "eye level" with the player character PC but facing downward. Moving the virtual camera to the angle downward allows the player character PC footing to be more easily viewable. This virtual camera angle also gives the player a more realistic sense of the player character PC running.

It should be appreciated that the virtual camera VC can be in such a position so that the player character PC is always in a substantially center field-of-view of the virtual camera VC. The virtual camera VC may also move to the second position in a linear correspondence with the speed of the player character. For example, the virtual camera VC may increase its movement to the second position as the player character PC increases its speed and may lower pitch of the viewing direction of the virtual camera VC as the player character increases its speed. The virtual camera VC may also move to the second position when the player character reaches a maximum speed.

Figure 8A:
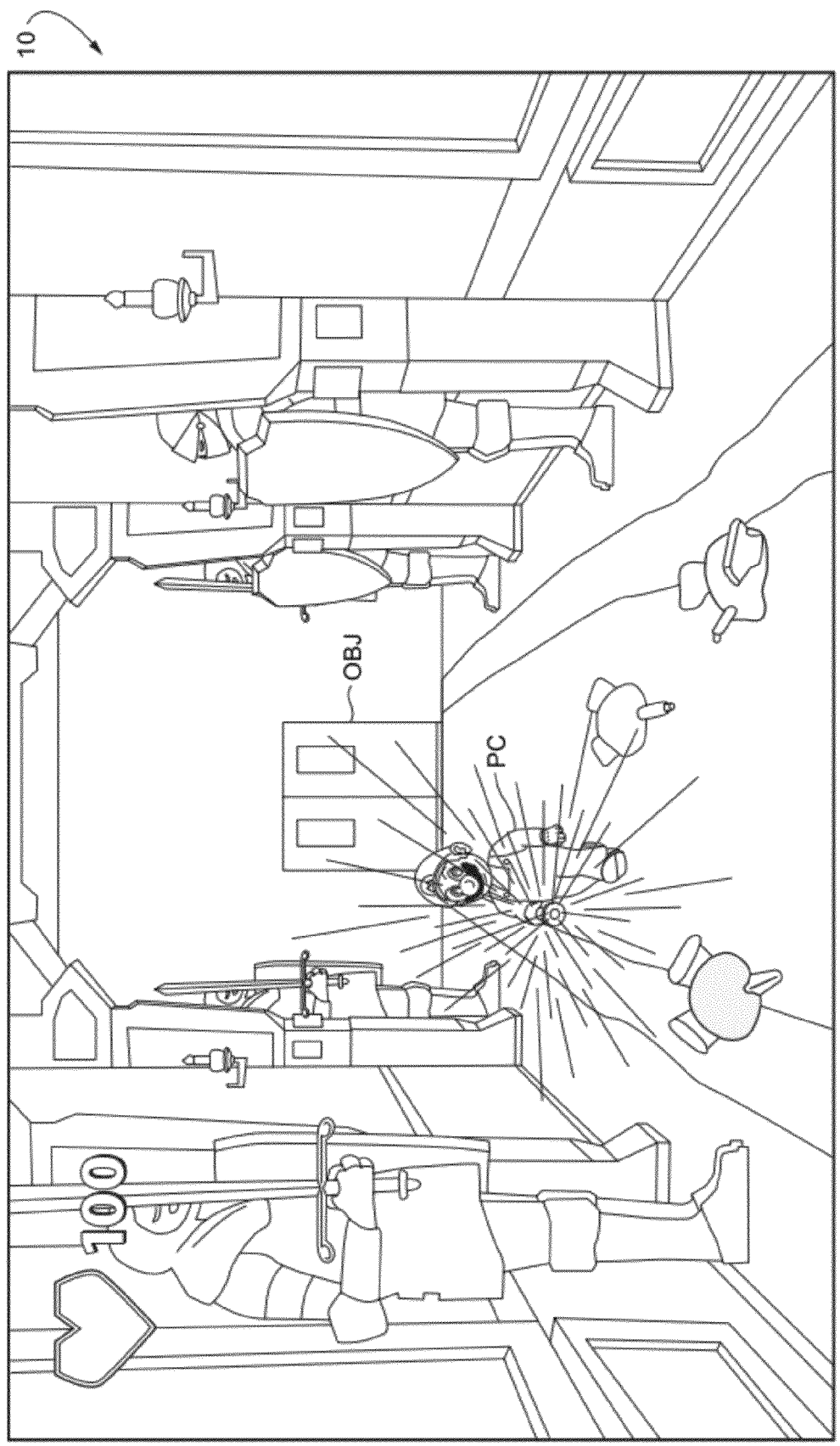
FIGS. 8A-B are examples showing an example implementation of the present system.
Figure 8B:
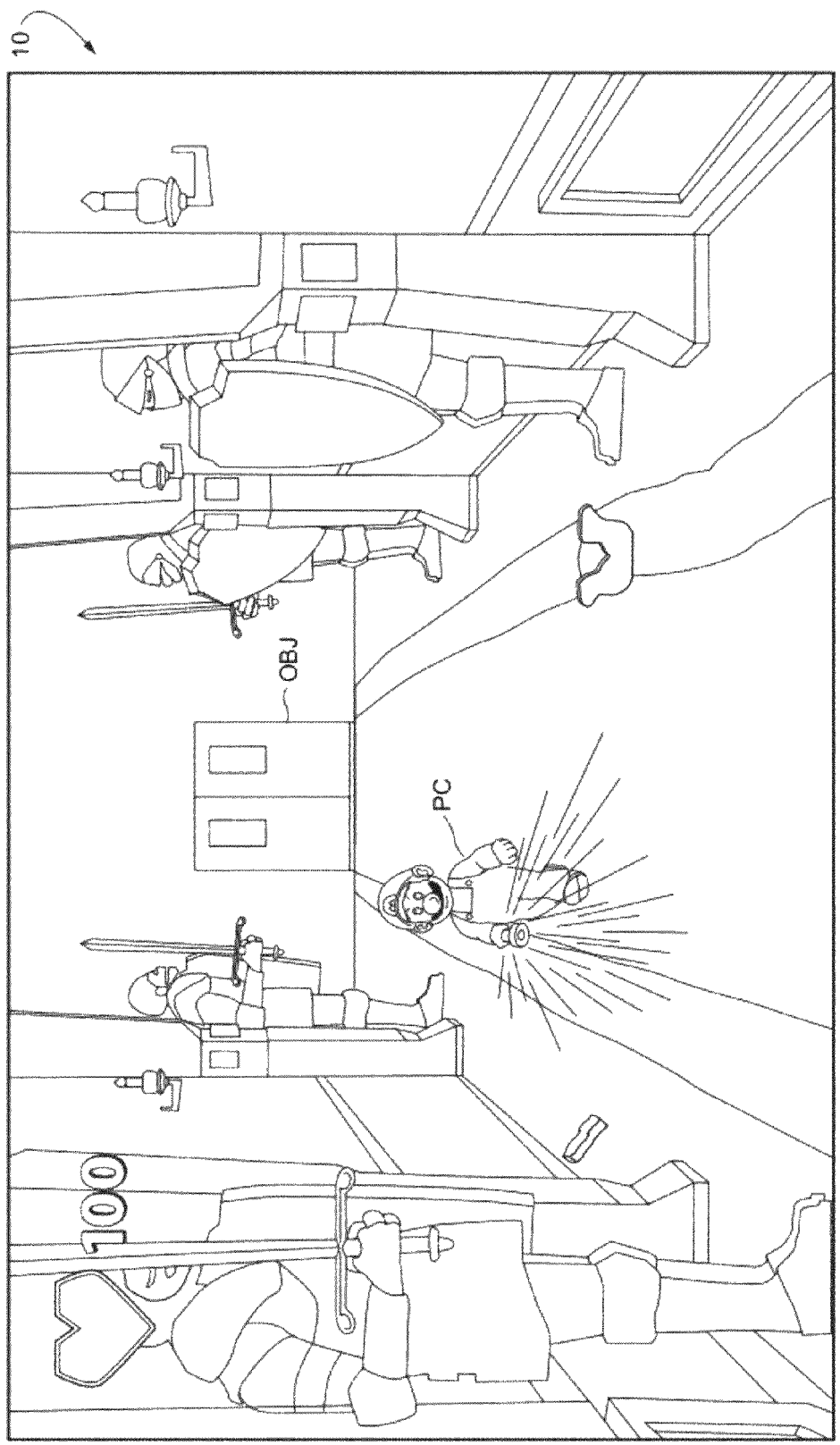

FIGS. 8A-B show examples of an embodiment of the present system, which may be shown for example in either LCD 12 or 22. FIG. 8A shows a situation where the player character is walking. As can be seen in FIG. 8A, the virtual camera is relatively level with the player character and the player character is walking toward the display and down a hallway.

FIG. 8B shows a situation where the game apparatus changes game states such that the player character is now running. As can be seen in FIG. 8B, the camera moves upward so that the player character's footing is made more easily viewable. Consequently, the door in the background moves higher as the camera moves upward yet changes the viewing angle to look downward.

Figure 9A:
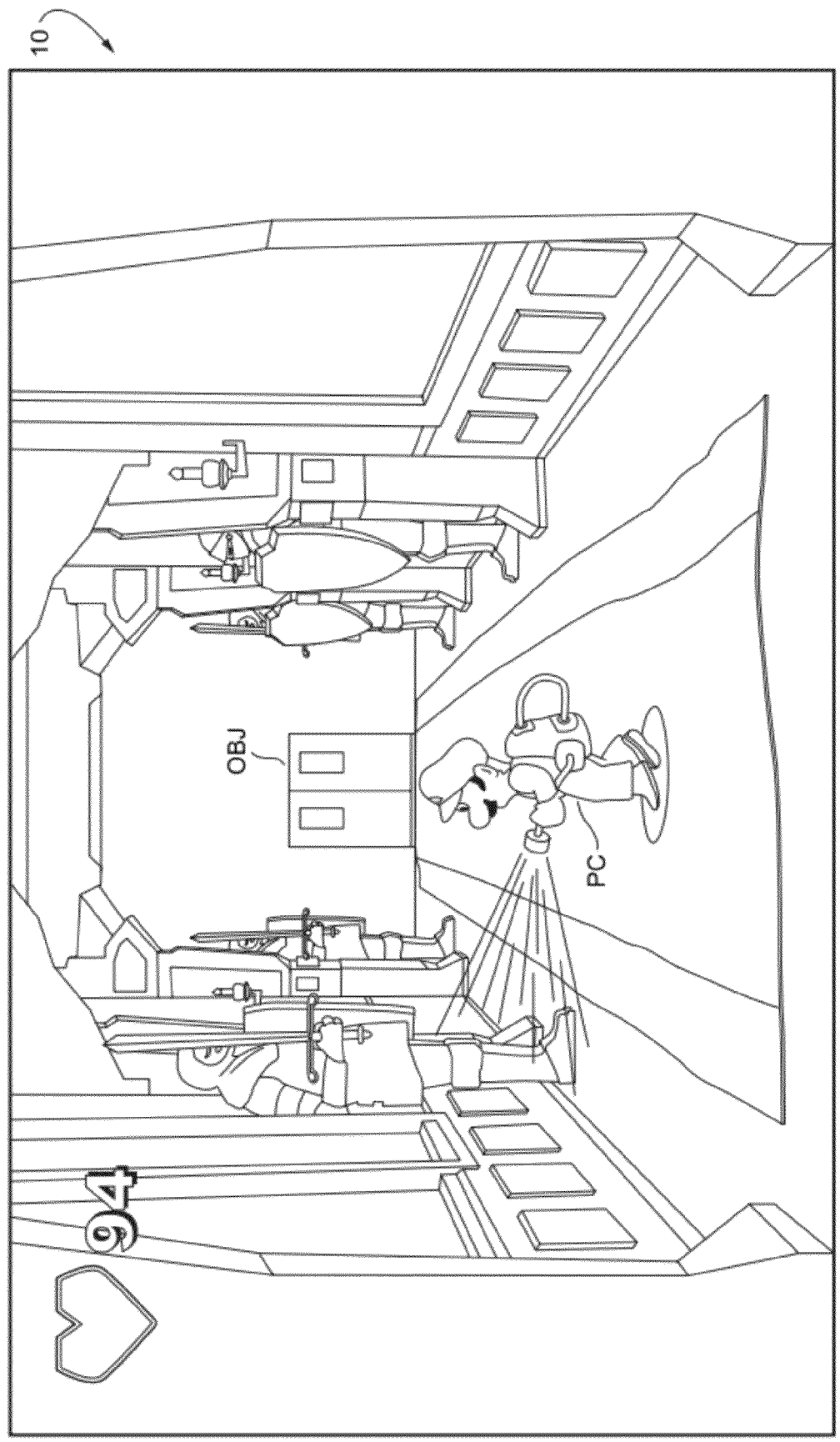
FIGS. 9A-B are further examples showing another example implementation of the present system.
Figure 9B:
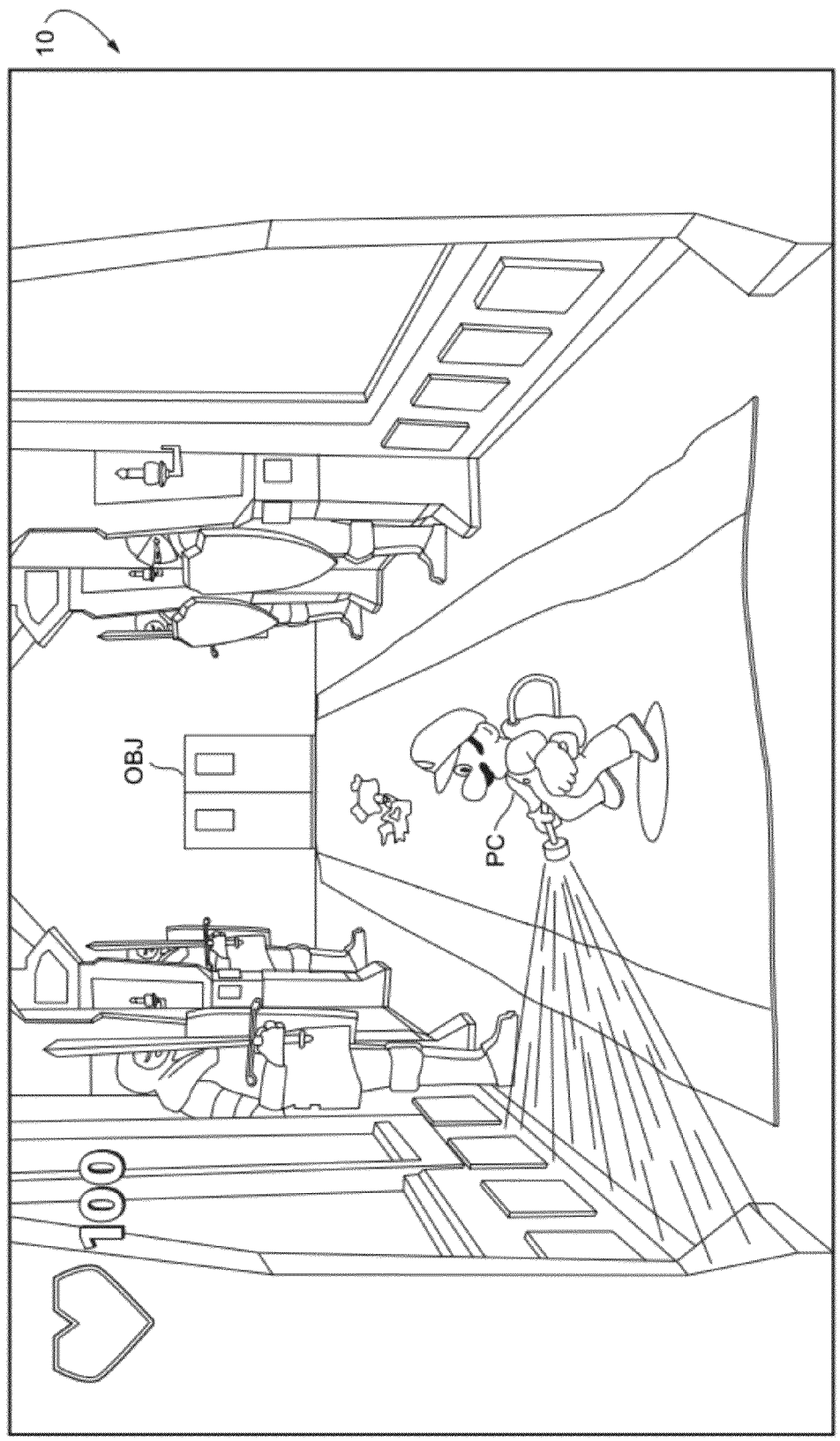

FIGS. 9A-B show examples of an embodiment of the present system, which may be shown for example in either LCD 12 or 22. FIG. 9A shows a situation of the virtual camera viewing the player character from a side view, while the player character is walking. Like the situation shown in FIG. 8A, the virtual camera is relatively level with the player character.

FIG. 9B shows a situation where the game apparatus changes game states such that the player character is being viewed from the side and running. Like FIG. 8B, FIG. 9B shows the virtual camera moving upward yet pointing downward so that the player character's footing is more easily viewable. The door in the background consequently rises with the downward viewing of the virtual camera.

While the system has been described above as using a single virtual camera, the same system can be implemented in a system using two or more virtual cameras. For example, the system can be implemented in a 3-D viewing system that uses at least two virtual cameras.

While the system has been described in connection with what is presently considered to be the most practical and preferred embodiment, it is to be understood that the system is not to be limited to the disclosed embodiment, but on the contrary, is intended to cover various modifications and equivalent arrangements included within the spirit and scope of the appended claims.

What is claimed is:

1. An information processing system, comprising:
a processing system having at least one processor, the processing system configured to:
position a virtual camera in an initial orientation while an object is moving at a first velocity, and
change downwardly the angle of orientation of the virtual camera while moving the virtual camera above the object from the initial orientation when the object transitions from moving at the first velocity to moving at a second velocity greater than the first velocity.

2. The system of claim 1, wherein the virtual camera keeps the object in a substantially center position of a viewpoint of the virtual camera while the object is moving at the second velocity.

3. The system of claim 1, wherein the object is a player character and a footing of the player character is viewable while the angle of orientation of the virtual camera is changed downwardly when the object transitions to moving at the second velocity.

4. The system of claim 3, wherein the player character is walking when moving at the velocity and running when moving at the second velocity.

5. The system of claim 1, wherein the virtual camera moves to a location above the object and has the angle of orientation viewing a direction downward toward the object when the object is moving at the second velocity.

6. The system of claim 1, wherein the processing system further configured to:
position the virtual camera in a first position while the virtual camera is in the initial orientation; and
move the virtual camera to a second position, above the first position, as the angle of orientation of the virtual camera changes downwardly when the object transitions from moving at the first velocity to moving at the second velocity.

7. The system of claim 6, wherein the virtual camera moves to the second position in a linear correspondence with a speed of the object.

8. The system of claim 6, wherein the virtual camera moves to the second position when the object reaches a maximum speed.

9. A non-transitory computer readable storage medium having computer readable code embodied therein for executing an application program, the program causing a computer having at least one processor to perform functionality comprising:
positioning a virtual camera in an initial orientation while an object is moving at a first velocity; and
changing downwardly the angle of orientation of the virtual camera while moving the virtual camera above the object from the initial orientation when the object transitions from moving at the first velocity to moving at a second velocity greater than the first velocity.

10. The non-transitory computer readable storage medium of claim 9, wherein the virtual camera keeps the object in a substantially center position of a viewpoint of the virtual camera while the object is moving at the second velocity.

11. The non-transitory computer readable storage medium of claim 9, wherein the object is a player character and a footing of the player character is viewable while the angle of orientation of the virtual camera is changed downwardly when the object transitions to moving at the second velocity second state.

12. The non-transitory computer readable storage medium of claim 11, wherein the player character is walking when moving at the first velocity and running when moving at the second velocity.

13. The non-transitory computer readable storage medium of claim 9, wherein the virtual camera moves to a location above the object and has the angle of orientation viewing a direction downward toward the object when the object is moving at the second velocity.

14. The non-transitory computer readable storage medium of claim 9, wherein the program causing the computer to further perform functionality comprising:
positioning the virtual camera in a first position while the virtual camera is in the initial orientation; and moving the virtual camera to a second position, above the first position, as the angle of orientation of the virtual camera changes downwardly when the object transitions from moving at the first velocity to moving at the second velocity.

15. The non-transitory computer readable storage medium of claim 14, wherein the virtual camera moves to the second position in a linear correspondence with a speed of the object.

16. The non-transitory computer readable storage medium of claim 14, wherein the virtual camera moves to the second position when the object reaches a maximum speed.

17. A gaming apparatus comprising at least one processor, the gaming apparatus configured to:
 position a virtual camera in an initial orientation while an object is moving at a first velocity; and
 change downwardly the angle of orientation of the virtual camera while moving the virtual camera above the object from the initial orientation when the object transitions from moving at the first velocity to moving at a second velocity greater than the first velocity.

18. The gaming apparatus of claim 17, wherein the virtual camera keeps the object in a substantially center position of a viewpoint of the virtual camera while the object is moving at the second velocity.

19. The gaming apparatus of claim 17, wherein the object is a player character and a footing of the player character is viewable while the angle of orientation of the virtual camera is changed downwardly when the object transitions to moving at the second velocity.

20. The gaming apparatus of claim 19, wherein the player character is walking when moving at the first velocity and running when moving at the second velocity.

21. The gaming apparatus of claim 17, wherein the virtual camera moves to a location above the object and has the angle of orientation viewing a direction downward toward the object when the object is moving at the second velocity.

22. The gaming apparatus of claim 17, further configured to:
 position the virtual camera in a first position while the virtual camera is in the initial orientation; and
 move the virtual camera to a second position, above the first position, as the angle of orientation of the virtual camera changes downwardly when the object transitions from moving at the first velocity to moving at the second velocity.

23. The gaming apparatus of claim 22, wherein the virtual camera moves to the second position in a linear correspondence with a speed of the object.

24. The gaming apparatus of claim 22, wherein the virtual camera moves to the second position when the object reaches a maximum speed.

25. A method comprising:
 generating, using one or more processors, a first image of a virtual object in a field of view of a virtual camera having an initial orientation and an initial position in a virtual world;
 receiving an input to increase a moving speed of the virtual object within the virtual world;
 raising the position of the virtual camera from the initial position upon receiving the input to increase the moving speed of the virtual object;
 downwardly changing the orientation of the virtual camera from the initial orientation upon receiving the input to increase the moving speed of the virtual object; and
 generating a second image of the virtual object in a field of view of the virtual camera at the raised position and downwardly changed orientation.

26. The method of claim 25, wherein a lowest part of the virtual object is more easily viewable in the second image than in the first image.

27. The method of claim 25, wherein raising the position of the virtual camera occurs simultaneously with downwardly changing the orientation of the virtual camera.

28. The method of claim 25, wherein the virtual object is a player character and a lowest part of the virtual object is a footing of the player character.

29. A system comprising:
 a device configured to provide an instruction to increase a moving speed of a virtual object within a virtual world; and
 one or more processors configured to perform functionality comprising:
  generate a first image of the virtual object in a field of view of a virtual camera having an initial orientation and an initial position;
  raise, based upon on the instruction to increase the moving speed of the virtual object, the position of the virtual camera from the initial position;
  change downwardly, based upon on the instruction to increase the moving speed of the virtual object, the orientation of the virtual camera from the initial orientation; and
  generate at least a second image of the virtual object in a field of view of the virtual camera having the changed orientation and the changed position.

30. The system of claim 29, wherein a lowest part of the virtual object is more easily viewable in the second image than in the first image.

31. The system of claim 29, wherein the computer processor is configured to raise the position of the virtual camera simultaneously with the downward change to the orientation of the virtual camera.

32. The system of claim 29, wherein the device is a handheld user-operable device.

33. The system of claim 29, wherein the virtual object is a player character and a lowest part of the virtual object is a footing of the player character.

* * * * *